US009752211B2

(12) United States Patent
Mitsui et al.

(10) Patent No.: US 9,752,211 B2
(45) Date of Patent: Sep. 5, 2017

(54) NEUTRALIZATION METHOD AND NEUTRALIZATION PLANT (71) Applicant: SUMITOMO METAL MINING CO., LTD., Tokyo (JP)

(72) Inventors: Hiroyuki Mitsui, Tokyo (JP); Osamu Nakai, Tokyo (JP); Satoshi Matsubara, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 379 days.

(21) Appl. No.: 14/382,737

(22) PCT Filed: Mar. 1, 2013

(86) PCT No.: PCT/JP2013/055707
§ 371 (c)(1),
(2) Date: Sep. 3, 2014

(87) PCT Pub. No.: WO2013/133173
PCT Pub. Date: Sep. 12, 2013

(65) Prior Publication Data
US 2015/0023850 A1 Jan. 22, 2015

(30) Foreign Application Priority Data

Mar. 6, 2012 (JP) .................. 2012-049514

(51) Int. Cl.
*C22B 3/00* (2006.01)
*C22B 3/04* (2006.01)
(52) U.S. Cl.
CPC ............ *C22B 23/0461* (2013.01); *C22B 3/04* (2013.01); *C22B 23/0423* (2013.01); *Y02P 10/234* (2015.11)

(58) Field of Classification Search
None
See application file for complete search history.

(56) References Cited

U.S. PATENT DOCUMENTS

2010/0028227 A1 2/2010 Shibayama et al.
2010/0034716 A1 2/2010 Nakai et al.

FOREIGN PATENT DOCUMENTS

JP A-6-116660 4/1994
JP A-2005-350766 12/2005
(Continued)

OTHER PUBLICATIONS

International Search Report issued in International Patent Application No. PCT/JP2013/055707 mailed Jun. 4, 2013.

*Primary Examiner* — Melissa Swain
(74) *Attorney, Agent, or Firm* — Oliff PLC (57) ABSTRACT

A method for improving the filterability in separating a zinc sulfide, produced by applying sulfurization treatment to a post-neutralization solution containing zinc together with nickel and cobalt in a dezincification step in a hydrometallurgical process for nickel oxide ore. The method includes a neutralization reaction step of neutralizing leachate in a neutralization tank, a separation step of separating neutralized slurry into a neutralized sediment and a post-neutralization solution by adding flocculant to the neutralized slurry, a measuring step of measuring the viscosity of the post-neutralization solution, a step of storing the post-neutralization solution in a storage tank, and a transfer step of transferring the stored post-neutralization solution to a dezincification reaction tank used in a dezincification step subsequent to a neutralization step.

5 Claims, 4 Drawing Sheets (56) References Cited

FOREIGN PATENT DOCUMENTS

| JP | A-2010-31341 | 2/2010 |
| JP | A-2010-37626 | 2/2010 |
| WO | WO 2011/129395 A1 | 10/2011 |

NEUTRALIZATION METHOD AND NEUTRALIZATION PLANT

FIELD OF THE INVENTION

The present invention relates to a neutralization method and a neutralization plant, more particularly to a neutralization method used in a neutralizing step of neutralizing leachate produced by solid-liquid separating leached slurry and of producing neutralized sediment containing impurities and a post-neutralization solution containing zinc together with nickel and cobalt, in a hydrometallurgical process for nickel oxide ore, and a neutralization plant used for in the neutralization.

This application claims priority to Japanese Patent Application No. 2012-049514 filed on Mar. 6, 2012, the entire contents of which are incorporated by reference herein.

BACKGROUND OF THE INVENTION

Recently, the High Pressure Acid Leach: HPAL by using sulfuric acid has been gathering attention, as a hydrometallurgical process for nickel oxide ore. This process does not include dry steps, such as a reduction step and a drying step, unlike the pyrometallurgy process, that is a conventional common metallurgical process for nickel oxide ore, but comprises a continuous wet process. Thus, it is advantageous in regards to energy and cost. Additionally, the process has the advantage of capable of providing a sulfide containing nickel and cobalt whose nickel grade is upgraded up to about 50% by weight or so (hereinafter, referred sometimes to as a mixed nickel-cobalt sulfide).

The hydrometallurgical process for nickel oxide ore by utilizing this HPAL process comprises, for example, the following steps. Namely, a leaching step of leaching slurry, under high temperature and high pressure, by adding sulfuric acid to slurry of the nickel oxide ore to produce leached slurry; a solid-liquid separating step of separating residue while multistage cleaning the leached slurry to produce leachate containing impurity elements together with nickel and cobalt; a neutralization step of separating neutralized sediment containing the impurity elements by controlling pH of the leachate produced by separating the residue to produce a post-neutralization solution containing zinc together with nickel and cobalt; a dezincification step of producing a zinc sulfide by adding a hydrogen sulfide gas to the post-neutralization solution and separating the zinc sulfide to produce a mother liquid for nickel recovery containing nickel and cobalt; and a nickel recovery step of producing a mixed sulfide containing nickel and cobalt by adding the hydrogen sulfide gas to the mother liquid for nickel recovery to separate a mixed nickel-cobalt sulfide.

Herein, in the above-mentioned neutralization step in the hydrometallurgical process, for example, the leachate produced from the solid-liquid separating step is introduced into a neutralization tank where the leached is neutralized by adding calcium carbonate slurry, and a produced hydroxide sediment is solid-liquid separated to produce a neutralized sediment and a post-neutralization solution.

In the dezincification step, the post-neutralization solution is introduced into a sulfurization reaction tank where zinc and copper or the like, contained in the post-neutralization solution is sulfurized by adding a sulfurizing agent, such as a hydrogen sulfide gas and a sodium hydro sulfide, followed by solid-liquid separation of a sulfurized post-neutralization solution with a filter press or the like, to produce the zinc sulfide and the mother liquid for nickel recovery containing nickel and cobalt (for example, see Patent Documents 1 and 2).

Incidentally, since the mixed nickel-cobalt sulfide produced by this hydrometallurgical process is further used as raw materials for purifying even electronic nickel and electronic cobalt, it is required for Zn concentration in the post-solution to reduce to 1 mg/L or less, in the dezincification step.

In the dezincification step, it is desirable to prevent the occurrence of clogging in a filter cloth to suppress a reduction in a filtration rate in filtrating and separating the produced zinc sulfide by using the filter cloth.

As a method for preventing the clogging in the filter cloth, it has been proposed hitherto a technique of causing suspended solid composed of the neutralized sediment and the leached residue to be remained, and improving the filterability of the filter cloth, with pH of the post-neutralization solution produced in the above-mentioned neutralization step adjusted to 3.0 to 3.5, and the turbidity of the post-neutralization solution to 100 to 400 NTU (for example, see Patent Document 3).

However, it is true the technique disclosed in the Patent Document 3 undoubtedly succeeded in substantially improving a filtration rate, and decreasing the frequency of clogging in the filter cloth, as compared with the prior art in those days, but the clogging is still occurring in the filter cloth. On that account, it has been under the necessity to take any measure of restoring the filtration rate of the filter cloth to its original good condition by appropriately performing a cleaning operation of the clogged filter cloth. If once clogging occurs stubborn to the extent that the effect accomplished by the cleaning operation wears off, the filter cloth reaches its service life and one is forced to replace the clogged filter cloth with new one.

Cleaning and replacing operations of the filter cloth in such dezincification step entail a closedown of the neutralization plant and they compel one to do heavy labor. Hence, it has been longing thus far for the advent of a method for more effectively preventing the occurrence of the clogging in the filter cloth, and prolonging a service life of the filter cloth.

PRIOR ART DOCUMENT

Patent Document

PLT1: Japanese Patent Application Laid-Open No. H06-116660
PLT2: Japanese Patent Application Laid-Open No. 2005-350766
PLT 3: Japanese Patent Application Laid-Open No. 2010-037626

SUMMARY OF THE INVENTION

The present invention has been proposed in view of such circumstances in the prior art. An object of the present invention is to provide a method capable of improving the filterability of a filter cloth in separating a zinc sulfide produced by applying sulfurization treatment to a post-neutralization solution containing zinc together with nickel and cobalt, and prolonging a service life of the filter cloth, in a dezincification step in the hydrometallurgy process for nickel oxide ore.

As a result of intensive study made by the inventors of the present invention in order to attain the above-mentioned object, they are paid their attention to the viscosity of a post-neutralization solution produced through a neutralization step in the hydrometallurgy process for nickel oxide ore. Then, they verified that when a zinc sulfide is produced by adding a hydrogen sulfide gas to the post-neutralization solution having high viscosity, slurry containing the zinc sulfide showed increased viscosity, suffering from impaired filterability of the filter cloth in filtering and separating the post-neutralization solution. The inventors found from this that the filterability of the filter cloth can be enhanced, thus prolonging a service life of the filter cloth in separating the zinc sulfide produced in the dezincification step subsequent to the neutralization step by returning back a predetermined rate of the post-neutralization solution whose viscosity became higher than predetermined viscosity in the neutralization. Thus, the inventions finally completed their invention.

Namely, the neutralization method according to the present invention is a neutralization method used in a neutralization step of neutralizing leachate produced by leaching nickel oxide ore, and producing neutralized sediment containing impurities and a containing zinc together with nickel and cobalt, in a hydrometallurgy process for nickel oxide ore, the method comprises: a neutralization reaction step of neutralizing the leachate in a neutralization reaction tank; a separation step of separating neutralized slurry into neutralized sediment and the post-neutralization solution by adding flocculant to the slurry; a viscosity measuring step of measuring the viscosity of the post-neutralization solution produced through the separation step; a storing step of temporarily storing the post-neutralization solution in a storage tank; and a flow-feeding step of transferring the stored post-neutralization solution to a dezincification reaction tank used in a dezincification step subsequent to the neutralization step, wherein in the flow-feeding step, when the viscosity of the post-neutralization solution measured in the viscosity measuring step is higher than 0.10 sec/cm$^2$·mL that is the time required for the of 50 mL to pass through a membrane filter having a mesh opening size of 0.45 µm, a flow rate of the post-neutralization solution to be transferred to the dezincification reaction tank is controlled, and the post-neutralization solution is circulated by returning back a predetermined rate of the post-neutralization solution to the neutralization reaction tank.

Namely, a neutralization plant according to the present invention is a neutralization plant used for in neutralization used in a neutralization step of neutralizing leachate produced by leaching nickel oxide ore and producing neutralized sediment containing impurities and a post-neutralization solution containing zinc together with nickel and cobalt, in a hydrometallurgy process for nickel oxide ore, the plant comprises: a neutralization reaction tank where the leachate is neutralized by adding neutralizer to the leachate; a separation tank where neutralized slurry is separated into a neutralized sediment and a post-neutralization solution by adding flocculant to the neutralized slurry; a storage tank where the post-neutralization solution transferred from the separation tank is temporarily stored; and a viscosity measuring portion measuring the viscosity of the post-neutralization solution stored in the storage tank, wherein the storage tank is provided with a flow-feeding pipe to which a transfer pipe which is branched off at a predetermined position having a switching valve and transfers, at the branched position, the post-neutralization solution to a dezincification reaction tank used in a dezincification step subsequent to the neutralization step, and a circulation pipe circulating the post-neutralization solution by returning back a predetermined ratio of the post-neutralization solution to the neutralization reaction tank are coupled, and wherein when the viscosity of the post-neutralization solution measured in the viscosity measuring step is higher than 0.10 sec/cm$^2$·mL that is the time required for the post-neutralization solution of 50 mL to pass through a membrane filter having a mesh opening size of 0.45 µm, the plant is configured to control a flow rate of the post-neutralization solution to be transferred to the dezincification reaction tank via the transfer pipe, and circulate the post-neutralization solution by returning back a predetermined rate of the post-neutralization solution to the neutralization reaction tank via the circulation pipe.

Advantageous Effect of the Invention

According to the neutralization plant and the neutralization method of the present invention, since the invention allows the post-neutralization solution having high viscosity produced in the neutralization step in the hydrometallurgy process for nickel oxide ore to be prevented from being transferred to the dezincification step subsequent to the neutralization step, and suppressing the viscosity of the zinc sulfide produced by applying sulfurization treatment to the post-neutralization solution from becoming higher, the invention enables the filterability to be improved in separating the zinc sulfide, and effectively prevents the occurrence of the clogging in the filter cloth, thereby prolonging a service life of the filter cloth.

DETAILED DESCRIPTION OF THE INVENTION

Hereinafter, embodiments of a neutralization method and a neutralization plant of the present invention will be described in the order, as indicated below.
1. Summary of the present invention
2. Regarding hydrometallurgy process for nickel oxide ore
3. Regarding each step in hydrometallurgy process
    3-1. Leaching step
    3-2. Solid-liquid separating step
    3-3. Neutralization step
    3-3-1. Neutralization plant
    3-3-2. Neutralization process
    3-3-3. Flow control of post-neutralization solution
    3-4. Dezincification step
    3-4-1. Dezincification plant
    3-4-2. Operation method for dezincification plant
    3-5. Nickel recovering step (mixed nickel-cobalt sulfide producing step)
4. Examples

1. SUMMARY OF THE PRESENT INVENTION

A neutralization method and a neutralization plant used for in the neutralization method according to the present invention is a neutralization method and a neutralization plant, which neutralize leachate produced by leaching nickel oxide ore and produce a neutralized sediment and a post-neutralization solution, in the hydrometallurgy process for nickel oxide ore.

According to the neutralization method and the neutralization plant, they allow the filterability of a filter cloth to be improved in solid-liquid separating a dezincification sulfide produced in a dezincification step subsequent to a neutralization step in the hydrometallurgy process, and suppressing the occurrence of the clogging in a filter cloth used in separation, thereby prolonging a service life of the filter cloth. Additionally, they allow the frequency of cleaning operation of the filter cloth or the like, to be substantially reduced, which enables an effective smelting operation. It is evident from this that their industrial value is very high.

Specifically, the present invention is configured to control a flow rate of the post-neutralization solution to be transferred to a dezincification step, depending on the measured results of the viscosity of post-neutralization solution, and repeatedly contribute a predetermined rate of the post-neutralization solution to the neutralization when neutralizing leachate of the nickel oxide ore, measuring the viscosity of the post-neutralization solution produced by separating a sediment containing impurity elements, and temporarily storing the post-neutralization solution, and transferring the post-neutralization solution to the dezincification step subsequent to the neutralization step. Controlling flow feeding of the post-neutralization solution, in this way, in the neutralization in the neutralization step enables the post-neutralization solution having high viscosity to be suppressed from being transferred to the dezincification step subsequent to the neutralization step, thereby more effectively improving the filterability of the filter cloth in the dezincification step.

Hereinafter, specific embodiments to which the present invention is applied will be described in detail with reference to the accompanying drawings. It should be noted that present invention is not necessarily limited to the embodiments mentioned below and may be modified in various ways without departing from the gist of the present invention.

2. REGARDING HYDROMETALLURGICAL PROCESS FOR NICKEL OXIDE ORE

Firstly, before entering into a description of the neutralization method and the neutralization plant according to the present invention, a description shall be made to the hydrometallurgy process for nickel oxide ore including the neutralization step in which the neutralization method is carried out. The hydrometallurgy process for nickel oxide ore is a hydrometallurgical process for recovering nickel and cobalt from slurry of the nickel oxide ore by utilizing, for example, High Pressure Acid Leach (HPAL) process.

Figure 1:
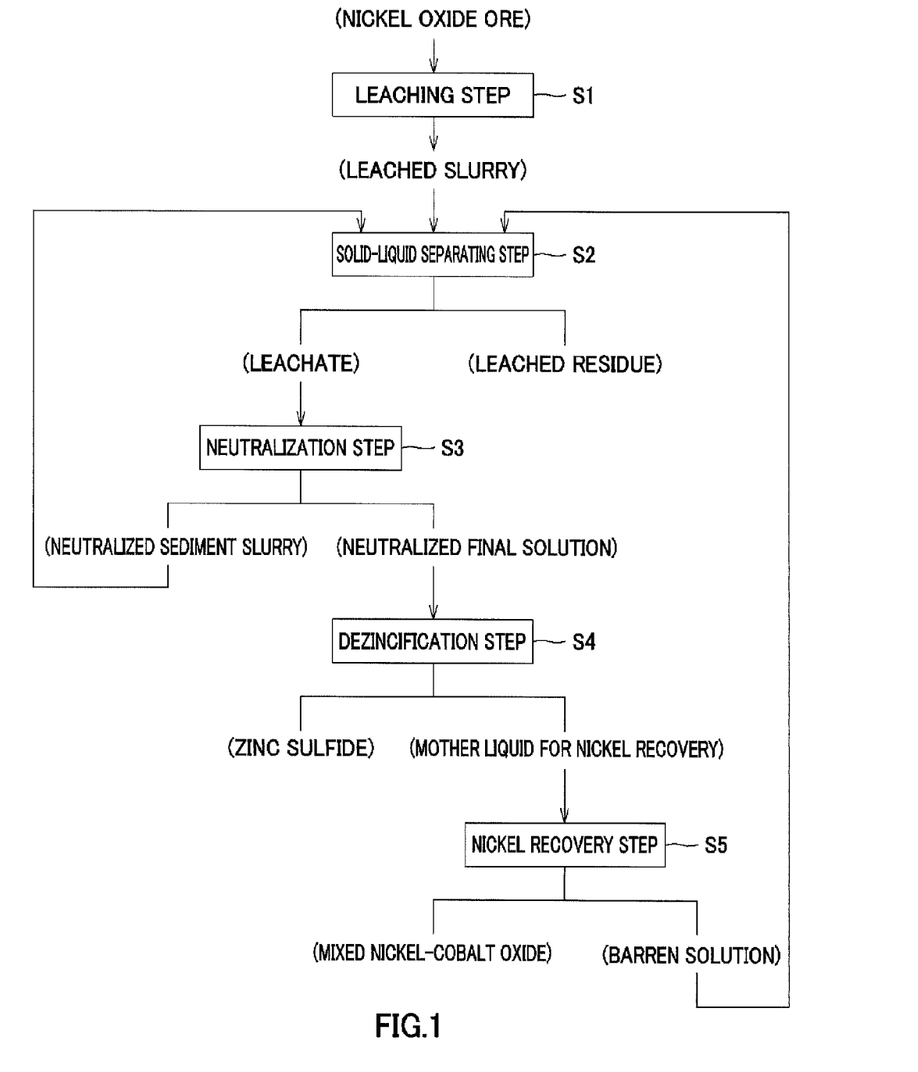
FIG. 1 is a flow chart of a hydrometallurgy process for nickel oxide ore.

FIG. 1 shows one example of a flow chart of the hydrometallurgy process for nickel oxide ore by utilizing HPAL process. As shown in FIG. 1, the hydrometallurgy method for nickel oxide ore comprises a leaching step S1 of leaching slurry, under high temperature and high pressure, by adding sulfuric acid to the slurry of the nickel oxide ore; a solid-liquid separating step S2 of separating residue while multi-stage cleaning leached slurry to produce leachate containing impurity elements together with nickel and cobalt; a neutralization step S3 of separating a neutralized sediment containing the impurity elements to produce a post-neutralization solution containing zinc together with nickel and cobalt by controlling pH of the leachate; a dezincification step S4 of producing zinc sulfide by applying sulfurization treatment to the post-neutralization solution and separating the zinc sulfide to produce a mother liquid for nickel recovery containing nickel and cobalt; and a nickel recovery step S5 of producing a mixed sulfide containing nickel and cobalt by applying sulfurization treatment to the mother liquid for nickel recovery. Hereinafter, a specific description will be given to each step to be described later.

3. REGARDING EACH STEP OF HYDROMETALLURGY PROCESS

<<3-1. Leaching Step>>

In the leaching step S1, leached slurry is produced by adding sulfuric acid to ore slurry produced by smashing nickel oxide ore that are raw materials, for example, by utilizing the HPAL process. Specifically, the ore slurry is stirred by applying pressure, under high temperature conditions of 220 to 280 degrees C., for example, by using a high temperature pressurized vessel (autoclave) to produce leached slurry composed of leachate and a leached residue.

An example of the nickel oxide ore used in the leaching step S1 includes, mainly, so-called, laterite ore, such as limonite ore and saprolite ore. The nickel content of the laterite is generally 0.8 to 2.5% by weight and is contained as hydroxide or silicic magnesia ore (magnesium silicate). The iron content is 10 to 50% by weight and is contained mainly in the form of trivalent hydroxide (goethite) where a portion of bivalent iron is contained in the silicic magnesia ore. In the leaching step S1, oxidized ore containing valuable materials, such as nickel, cobalt, manganese, and copper, for example, manganese nodules or the like, existing on the abyssal floor are used, in addition to such laterite ore.

Specifically, in the leaching step S1, a leaching reaction and a high temperature thermal hydrolysis reaction represented by the following equations (1) to (5) occur, where leaching of nickel and cobalt or the like, as sulfate, and immobilization of leached iron sulfate as hematite are taken place. However, as immobilization of a ferrous ion progresses incompletely, a liquid portion of the produced leached slurry generally contains a ferrous ion of 2 and 3 valences, in addition to nickel and cobalt or the like.

Leaching reaction equation (1)

(where, in the equation (1), M indicates Ni, Co, Fe, Zn, Cu, Mg, Cr, Mn or the like), equation (2)

equation (3)

High temperature thermal hydrolysis reaction equation (4)

equation (5)

No special limitation is imposed on the content of the addition of sulfuric acid in the leaching step S1 but an excess quantity where iron contained in the ore is leached out may be used. For example, the content is defined to be 300 to 400 kg per ore of 1 ton. When the content of addition of the sulfuric acid per ore of 1 ton exceeds 400 kg, it is not preferable as the sulfuric acid becomes costly.

In the leaching step S1, it is preferable to control pH of the produced leachate to be 0.1 to 1.0 from the point of view of the filterability of the leached residue containing hematite to be produced in a solid-liquid separating step S2 subsequent to the leaching step S1.

<<3-2. Solid-Liquid Separating Step>>

In the solid-liquid separating step S2, leached slurry produced in the leaching step S1 is multistage cleaned to produce leachate containing zinc, as impurity elements, in addition to nickel and cobalt, and a leached residue.

Specifically, in the solid-liquid separating step S2, a solid-liquid separation is performed by using a solid-liquid separator, such as a thickener after the leached slurry is mixed with a cleaning solution. Firstly, the slurry is diluted with the cleaning solution, and secondly, leached residue is condensed as a sediment from the thickener. This allows the nickel adhered to the leached residue to be decreased according to the degree of dilution thereof. In a real operation, a thickener having such capability is used by coupling the thickener in a multistage for striving for improving a recovery rate.

No special limitation is imposed on a multistage cleaning method used in the solid-liquid separating step S2 but it is preferable to use the Counter Current Decantation (CCD) in which a cleaning solution not containing nickel is brought into contact with a countercurrent. This enables a cleaning solution to be newly introduced into the system to be reduced, thereby attaining a recovery rate of 95% or more for nickel and cobalt.

No special limitation is imposed on the cleaning solution but it may use that which is free from nickel and does not affect all the steps. Among other things, it is preferable to use that whose pH is 1 to 3. This is because an increase in pH of the cleaning solution creates a bulky aluminium hydroxide, and can cause poor sedimentation of the leached residue in the thickener when aluminium is contained in the leachate. From this, preferably, it should repeatedly use a barren solution having low pH (pH is 1 to 3 or so) produced in a nickel recovery step S5 subsequent to the solid-liquid separating step S2.

<<3-3. Neutralization Step>>

In a neutralization step S3, the neutralized sediment containing the impurity elements is separated by controlling pH of the leachate separated in the solid-liquid separating step S2 to produce the post-neutralization solution containing zinc together with nickel and cobalt.

Specifically, in the neutralization step S3, the post-neutralization solution serving as a mother liquid for nickel recovery and neutralized sediment slurry containing a trivalent ion as impurity elements are produced by adding neutralizer, such as calcium carbonate, to the leachate while suppressing oxidation of the separated leachate so that pH of the produced post-neutralization solution decreases to 4 or less. In the neutralization step S3, neutralizing the leachate in this way neutralizes excess acid used in the leaching step S1 by utilizing the HPAL process, produces a post-neutralization solution serving as a mother liquid for nickel recovery, and removes a trivalent iron ion and aluminium ion or the like, which being remained in the solution, as a neutralized sediment.

<3-3-1. Neutralization Plant>

More specifically, a description will be made to a neutralization method used in the neutralization step S3 and a neutralization plant in which the neutralization method is used.

Figure 2:
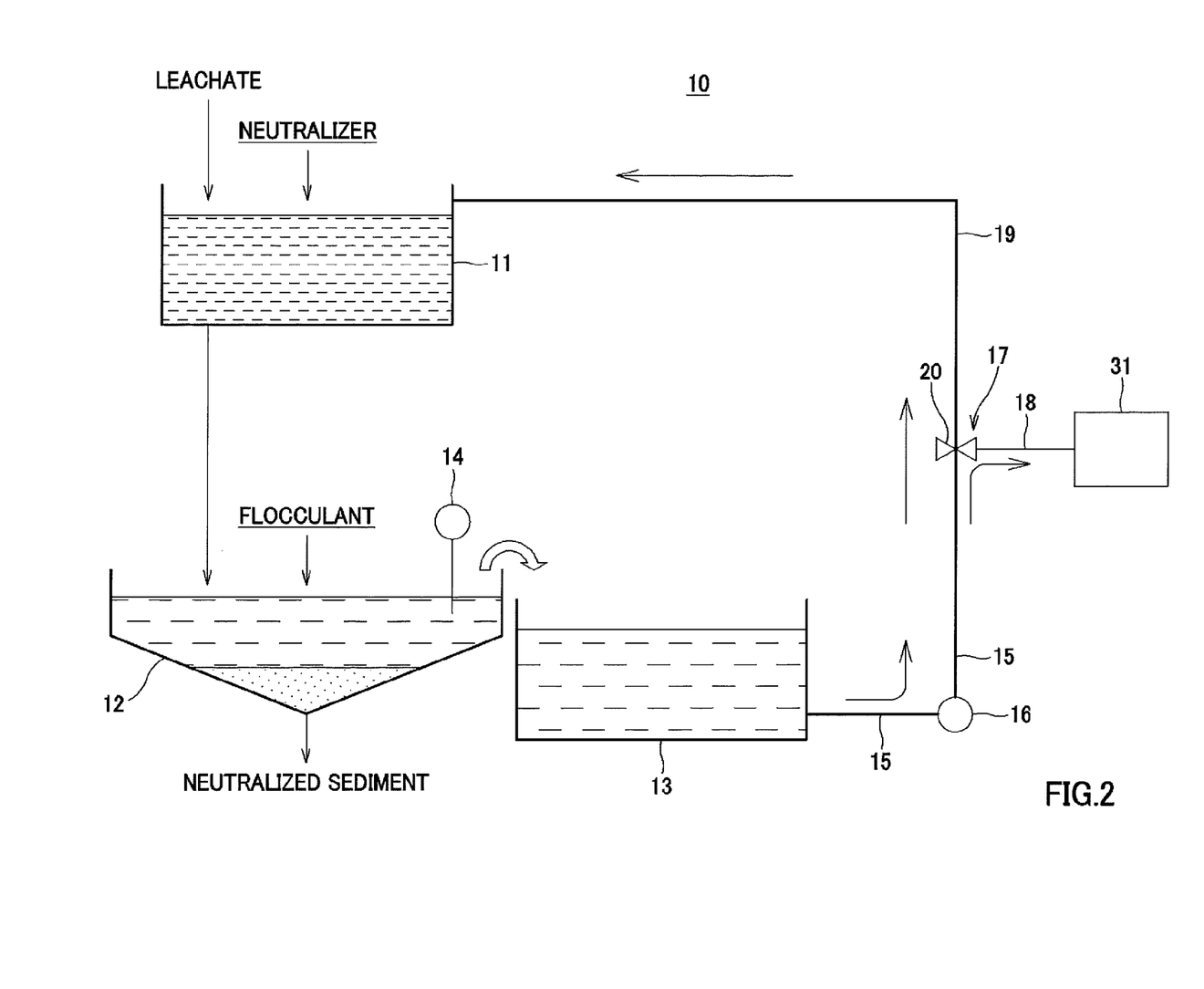
FIG. 2 is a schematic block diagram of a neutralization plant.

Firstly, an explanation will be made to the neutralization plant used in the neutralization step S3. FIG. 2 is a schematic block diagram showing an arrangement of the neutralization plant. As shown in FIG. 2, a neutralization plant 10 comprises a neutralization reaction tank 11 where leachate is neutralized; a separation tank 12 where the neutralized leachate is separated into the neutralized sediment and the post-neutralization solution; a storage tank 13 where the separated post-neutralization solution is temporarily stored; and a viscosity measuring portion 14 measuring the viscosity of the post-neutralization solution.

Within the neutralization reaction tank 11, the leachate separated in the solid-liquid separating step S2 is charged in the tank where the leachate is neutralized by adding neutralizer to the leachate.

The separation tank 12 is a solid-liquid separating apparatus, such as a thickener. Neutralized slurry produced by neutralization of the leachate in the neutralization reaction tank 11 is charged in and transferred to the separation tank 12 where the neutralized slurry is separated into a post-neutralization solution serving as a mother liquid for nickel recovery and neutralized sediment slurry containing trivalent iron as impurity elements. Within the separation tank 12, the post-neutralization solution produced by solid-liquid separation is overflowed therefrom and transferred to the storage tank 13 whereas the neutralized sediment slurry is taken out from the bottom of the separation tank 12. In this connection, the neutralized sediment slurry taken out from the bottom of the separation tank 12 may appropriately be repeatedly returned back to the solid-liquid separating step S2.

The storage tank 13 is configured to charge the post-neutralization solution separated in the separation tank 12 and transferred thereto, and the post-neutralization solution is temporarily stored therein before discharging the post-neutralization solution to the dezincification step S4 subsequent to the neutralization step S3. The storage tank 13 acts as a viscosity control buffer able to decrease the viscosity of the leachate produced by solid-liquid separation in the separation tank 12, the details of which will be described later.

No special limitation is imposed on the storage tank 13 but it is preferable to have a capacity corresponding to the amount of storage more than 3 hours with respect to a flow rate of the post-neutralization solution. This enables a storage time of the post-neutralization solution within the storage tank 13 to be lengthened, thereby effectively storing the post-neutralization solution therein.

The storage tank 13 is provided with a flow-feeding pipe 15 flow-feeding the stored post-neutralization solution to the dezincification step S4 subsequent to the neutralization step S3. The flow-feeding pipe 15 flow-feeds the post-neutralization solution stored in the storage tank 13 with the aid of a flow-feeding pomp 16. The flow-feeding pipe 15 is branched off at a predetermined position 17, to which a transfer pipe 18 transferring the post-neutralization solution stored in the storage tank 13 to a dezincification reaction tank 31 used in the dezincification step subsequent to the neutralization step S3, and a circulation pipe 19 circulating the post-neutralization solution by returning back a predetermined ratio of the post-neutralization solution to the neutralization reaction tank 11 are respectively connected. Further, a switching valve 20 is provided at the predetermined position 17 where the transfer pipe 18 and the circulation pipe 19 are coupled, and is configured to allow switching regulation of a rate of the leachate to be transferred via the flow-feeding pipe 15. As to how to transfer the leachate from the storage tank 13 via the flow-feeding pipe 15 will be described later.

The circulation pipe 19 coupled to the flow-feeding pipe 15 is provided with a heat exchanger (not shown) and is configured to heat a predetermined rate of the post-neutralization solution circulated back to the neutralization reaction tank 11, the details of which will be described later.

The viscosity measuring portion 14 measures the viscosity of the post-neutralization solution separated by the separation tank 12 and transferred to the storage tank 13. No special limitation is imposed on the viscosity measuring portion 14 but it may be provided in a pipe and a flow channel or the like, located in the middle of a watercourse of the post-neutralization solution overflown from the separation tank 12, and transferred to storage tank 13. Alternatively, a viscometer and a granularity measuring device may integrally be provided in the separation tank 12 for the purpose of measuring the viscosity of the post-neutralization solution that turns into a supernatant liquid after solid-liquid separation in the separation tank 12. Instead, the viscosity measuring portion 14 may be configured to measure the viscosity of the post-neutralization solution temporality stored in the storage tank 13.

<3-3-2. Neutralization Method>

Then, an description will be made to a neutralization method used in the neutralization step S3 by using the neutralization plant 10 having such an arrangement.

Figure 3:
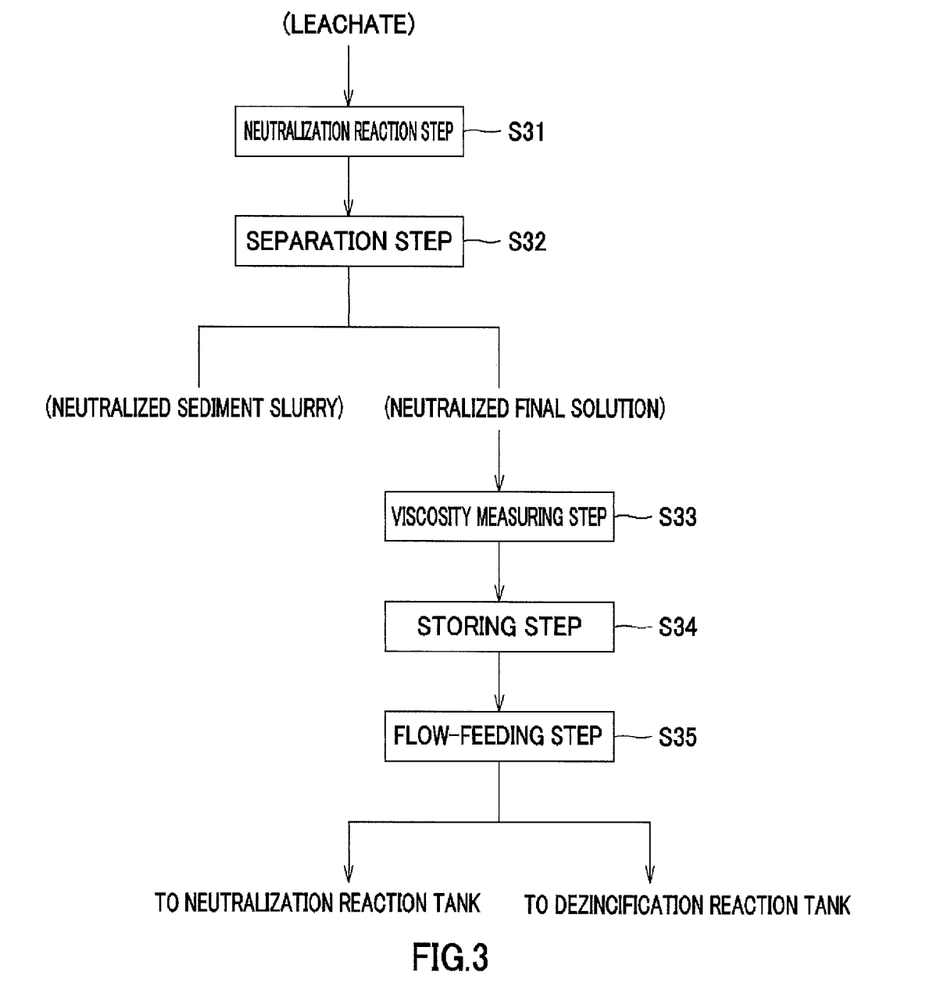
FIG. 3 is a flow chart of a neutralization method.

FIG. 3 shows an example of a flow chart of the neutralization method used in the neutralization step S3. The neutralization method comprise a neutralization reaction step S31 of neutralizing, in the neutralization reaction tank 11, the leachate produced through the solid-liquid separating step S2; a separation step S32 of separating in the separation tank 12 a neutralized slurry into neutralized sediment and a post-neutralization solution by adding flocculant to the slurry; a viscosity measuring step S33 of measuring, by the viscosity measuring portion 14, the viscosity of the post-neutralization solution produced through the separation step S32; a storing step S34 of temporarily storing the post-neutralization solution in the storage tank 13; and a flow-feeding step S35 of flow-feeding the stored post-neutralization solution.

(Neutralization Step)

In the neutralization reaction step S31, the charged leachate is neutralized in the above-mentioned neutralization reaction tank 11 of the neutralization plant 10 by adding neutralizer thereto. Specifically, in the neutralization reaction step S31, neutralizer, such as calcium carbonate, is added to the leachate so that pH of the post-neutralization solution to be produced is reduced to 4 or less, while suppressing oxidation of the leachate, to produce the post-neutralization solution serving as a mother liquid for nickel recovery and the neutralized sediment slurry containing trivalent iron as impurity elements.

In the neutralization reaction step S31, the post-neutralization solution is controlled by adding neutralizer to the leachate so that pH of the post-neutralization solution is reduced to 4 or less, preferably to 3.0 to 3.5, more preferably to 3.1 to 3.2. In the event that pH of the post-neutralization solution exceeds 4, a nickel hydroxide is generated in abundance.

In the neutralization reaction step S31, it is preferable to remain, in the post-neutralization solution, suspended solids composed of the neutralized sediment and the leached residue produced in the leaching step S1 so that the turbidity of the post-neutralization solution (sulfidized initial solution) transferred to the dezincification tank 31 used in the dezincification step S4 amounts to 100 to 400 NTU, in the dezincification step S4 subsequent to the neutralization step S3. Thus, it will be able to further improve the filterability of a dezincification sulfide produced in the dezincification step S4 subsequent to the neutralization step S3 by remaining the suspended solids to regulate the turbidity of the post-neutralization solution within the above-mentioned dezincification range.

In a neutralization reaction of the neutralization reaction step S31, it is preferable not to oxidize a ferrous ion existing in the solution as bivalent in removing a trivalent ferrous ion remaining in the solution. For this reason, it is rather preferable to prevent as much as possible the oxidation of the solution, for example, by blowing-in of air or the like. This allows an increase in the amount of consumption of calcium carbonate incident to removal of a bivalent ion to be suppressed, and the amount of production of the neutralized sediment slurry. Put differently, it can suppress a nickel recovery loss to the sediment due to an increase in the amount of the neutralized sediment slurry.

It is preferable for neutralization reaction temperature in the neutralization reaction step S31 to be 50 to 80 degrees C. or so. When reaction temperature is less than 50 degrees C., the neutralized sediment containing a trivalent ferrous ion produced is fined down and adversely affects a treatment in the solid-liquid step S2 in which the neutralized sediment is circulated, if necessary. Meanwhile, when reaction temperature exceeds 80 degrees C., it invites lowered corrosion resistance of the materials consisting the neutralization reaction tank 11 and increased energy cost for heating.

(Separation Step)

In the separation step S32, the post-neutralization solution serving as a mother liquid for nickel recovery and the neutralized sediment containing the impurity elements are separated from the neutralized slurry produced through the neutralization reaction step S31, in the above-mentioned separation tank 12 of the neutralization plant 10.

In the separation step S32, the slurry is separated into the post-neutralization solution and the neutralized sediment by adding flocculant to the neutralized slurry. Specifically, as flocculant, for example, anionic flocculant is used. Separating the slurry by adding the flocculant in this way accelerates sedimentation of the sediment composed of the produced impurity elements, which suppresses a fine suspended sediment (hereinafter simply referred to as "SS") to be contained in the overflowed solution, thereby effectively separating the slurry into the post-neutralization solution and the neutralized sediment.

In the separation step S32, the separated neutralized sediment slurry can be repeatedly transferred to the above-mentioned solid-liquid separating step S2, if necessary. This effectively recovers nickel contained in the neutralized sediment slurry. Specifically, the repeated transfer of the neutralized sediment slurry to the solid-liquid separating step S2, operated under low pH condition, accelerates dissolution of the hydroxide nickel produced, concurrently with cleaning of the leached residue, by adhesive moisture of the neutralized sediment and a local reaction on a surface of the neutralized sediment, thereby reducing nickel that will become a recovery loss.

An operation of repeatedly transferring the separated neutralized sediment slurry to the solid-liquid separating step S2 may be performed, in a case where the viscosity of the post-neutralization solution is determined to be higher than a predetermined value, the details of which will be described later. This prevents the post-neutralization solution having high viscosity from being transferred to the dezincification plant 30 used in the dezincification step S4 subsequent to the solid-liquid separating step S2, thereby improving the filterability in the solid-liquid separation in the dezincification step S4.

(Viscosity Measuring Step)

In the viscosity measuring step S33, the viscosity of the post-neutralization solution produced through the separation step S32 is measured in the above-mentioned viscosity measuring portion 14 of the neutralization plant 10. The viscosity of the post-neutralization solution should, for example, measure the viscosity of a supernatant liquid (overflow liquid) in the separation tank 12, as mentioned above. As an alternative, the viscosity measuring step may be used to measure the viscosity of the post-neutralization solution temporality stored in the storage tank 13, as a post step subsequent to a storing step to be described later.

While as a viscosity measuring method in the viscosity measuring step S33, no special limitation is imposed thereto, insofar as it can measure the viscosity of the post-neutralization solution that is a fluid, and a well-known method may be used, but it is preferable to use a method whose time required therefor is short and is simple, considering also a standpoint of management control. Alternatively, it may not have to calculate the viscosity, as a specific viscosity value of the post-neutralization solution, instead the viscosity may be analyzed by calculating an alternative property of the viscosity. Specifically, for example, it may use a method which measures the viscosity by using the time required for the post-neutralization solution to pass through a predetermined filter, and comprehends and manages this transit time as an alternative property of the viscosity.

Among other things, in the present embodiment, the time ($sec/cm^2 \cdot mL$) required for the post-neutralization solution of 50 mL (supernatant liquid) to pass through a membrane filter having a mesh opening size of 0.45 μm is used, as viscosity evaluation.

In the present embodiment, it is determined whether the viscosity of the post-neutralization solution measured in the viscosity measuring step S33 is higher than 0.10 $sec/cm^2 \cdot mL$. Based on the measured results, a transfer of the post-neutralization solution is controlled, the details of which will be described later.

(Storing Step)

In the storing step S34, the post-neutralization solution, which is produced by separation in the separation step S32 and whose viscosity is measured in the viscosity measuring step S33, is temporality stored in the above-mentioned storage tank 13 of the neutralization plant 10.

(Flow-Feeding Step)

In the flow-feeding step S35, the post-neutralization solution stored in the storage tank 13 in the storing step S34 is flow-fed. In the flow-feeding step S35, the post-neutralization solution stored in the storage tank 13 is mainly transferred to the dezincification reaction tank 31 used in the dezincification step S4 subsequent to the neutralization step S3. The transfer of the post-neutralization solution to the dezincification reaction tank 31, to put it concretely, is performed via the flow-feeding pipe 15 provided in the storage tank 13, and further through the transfer pipe 18 coupled to the flow-feeding pipe 15.

In the flow-feeding step S35, a flow rate of the post-neutralization solution transferred via the flow-feeding pipe 15 and the transfer pipe 18 coupled to the flow-feeding pipe 15 is controlled, according to measured results of the viscosity of the post-neutralization solution in the viscosity measuring step S33. The post-neutralization solution is circulated by returning back a predetermined rate of the post-neutralization solution to the neutralization reaction tank 11 via the circulation tank 19, which is branched off from the flow-feeding pipe 15 and coupled thereto.

<3-3-3. Flow Control of the Post-Neutralization Solution>

Conventionally, in the neutralization step S3, it has been making a point of adding flocculant in the slurry when the slurry produced by neutralizing the leachate is solid-liquid separated into the post-neutralization solution and the neutralized sediment. This enables the amount of SS to be reduced and the post-neutralization solution and the neutralized sediment to be effectively separated.

However, when the slurry is separated in this manner by adding the flocculant, the viscosity of the post-neutralization solution to be produced dramatically becomes higher by impact of the flocculant. In the dezincification step S4 subsequent to the neutralization step, the post-neutralization solution transferred from the neutralization step S3 is applied sulfurization treatment. When a post-neutralization solution having high viscosity is used at this moment, clogging occurs in a filter cloth, in solid-liquid separating the slurry into the sediment of a dezincification sulfide produced by sulfurization treatment and the mother liquid for nickel recovery, suffering from a remarkably lowered filtration rate. The occurrence of the clogging in the filter cloth causes a decrease in operation efficiency attributable to the increased frequency of work, such as cleaning, and shortens a service life of the filter cloth.

Then, in the neutralization method, the viscosity of the post-neutralization solution produced through the neutralization in the viscosity measuring step S33 is measured to determine whether the measured viscosity is higher than a predetermined value. Specifically, as an evaluation criteria for the viscosity of the post-neutralization solution, it is determined whether the time required for the post-neutralization solution of 50 mL to pass through a membrane filter having a mesh opening size of 0.45 μm is longer than 0.10 $sec/cm^2 \cdot mL$. If the time is determined to be longer than 0.10 $sec/cm^2 \cdot mL$, in the flow-feeding step S35, a flow rate of the post-neutralization solution to be transferred to the dezincification reaction tank 31 used in the dezincification step S4 is controlled, and the post-neutralization solution is circulated by returning back a predetermined rate of the post-neutralization solution to the neutralizing reaction tank 11.

If the viscosity of the post-neutralization solution is determined to be higher than 0.10 $sec/cm^2 \cdot mL$ under the above-mentioned viscosity evaluation criteria, no special limitation is imposed on a rate of the flow rate of the post-neutralization solution to be controlled in the flow-feeding step S35. As to a specific flow rate proportion, it should be determined depending on the magnitude of the viscosity of the post-neutralization solution measured in the viscosity measuring step S33. Nonetheless, it is preferable for a flow rate of the post-neutralization solution transferred to the dezincification reaction tank 31 passing through the transfer pipe 18 via the flow-feeding pipe 15 to set to 60 to 80% for the total flow rate, and a flow rate of the post-neutralization solution circulated passing through the circulation pipe 19 via the flow-feeding pipe 15 by returning back a predetermined rate of the post-neutralization solution to the neutralization reaction tank to set to 20 to 40% for the total flow rate. If the flow rate transferred to the dezincification reaction tank 31 is set to below 60%, it is likely to degrade the operation efficiency of the whole plant. Meanwhile, if a post-neutralization solution having high viscosity exceeding 80% is transferred, it is likely to be unable to provide a sufficient effect, to life extension of the filter cloth.

Thus, controlling the flow rate of the post-neutralization solution transferred to the dezincification reaction tank 31 used in the dezincification step, based on the measured results of the viscosity of the post-neutralization solution, and circulating the post-neutralization solution by repeatedly returning back a predetermined rate of the post-neutralization solution to the neutralization reaction tank 11 allow the post-neutralization solution having high viscosity to be prevented from being transferred to the dezincification reaction tank 31.

In the neutralization method, it is designed to temporality store the post-neutralization solution produced from the separation tank 12 through the separation step S32 in the storage tank 13 in the storing step S34. In this way, temporality storing the post-neutralization solution in the storage tank 13 without directly transferring the separated post-neutralization solution to the dezincification reaction tank 31 used in the dezincification step enables the post-neutralization solution to be stored in the storage tank 13. Since the post-neutralization solution, which has high viscosity and is circulated by returning back a predetermined rate of the post-neutralization solution to the neutralization tank 13, is stored in the storage tank 13 and the post-neutralization solution is mixed in proportion to the storing time thereof, the viscosity of the post-neutralization solution is effectively getting lower. In other words, the storage tank 13 soring the post-neutralization solution in the storing step S34 acts as a buffer in terms of the viscosity.

Particularly, when the post-neutralization solution is circulated by returning back a predetermined rate of the post-neutralization solution to the neutralization reaction tank 11 in the flow-feeding step S35, it is preferable to stop the addition of flocculant in the separation step S32. Thus, when the post-neutralization solution having high viscosity is circulated, stopping the addition of the flocculant in the separation step S32 results in that the post-neutralization solution produced through the neutralization reaction step S31 and the separation step S32 will contain only flocculant derived from the returned post-neutralization solution. As a result, the post-neutralization solution containing less flocculant is overflowed from the separation tank 12 and is transferred to the storage tank 13 where the transferred post-neutralization solution is stored, which effectively mixes the post-neutralization solution, thus more effectively lowering the viscosity of the post-neutralization solution.

Meanwhile, when the post-neutralization solution is circulated by returning back a predetermined rate of the post-neutralization solution to the neutralization reaction tank 11, stopping the addition of the flocculant in the separation step S32 leads to a lowered aggregation effect of the neutralized sediment. Thereby, it follows that a poorly aggregated neutralized sediment is mixed in an overflow solution serving as the post-neutralization solution, and the overflow solution gets muddy. It is deemed that when the post-neutralization solution that is the overflow solution containing muddiness is transferred to the dezincification step S4, clogging occurs in the filter cloth in separating the zinc sulfide and the mother liquid for nickel recovery, and shortens all the more a service life of the filter cloth. However, in the present embodiment, since the post-neutralization solution is temporarily stored in the storage tank 13 in the storing step S34, and the time for storing the post-neutralization solution in the storage tank 13 is taken, the most of the post-neutralization solution causing muddiness is deposited on the bottom of the storage tank 13. On this account, the neutralized sediment causing the muddiness can be prevented from being transferred to the dezincification step S4, thereby avoiding the occurrence of the shortcomings, as mentioned above.

Alternatively, when the post-neutralization solution is circulated by returning back a predetermined rate of the post-neutralization solution to the neutralization reaction tank 11, the amount of addition of the flocculant may be adjusted based on a flow rate of the post-neutralization solution to be circulated, instead of stopping the addition of the flocculant in the separation step S32. When the addition of the flocculant does not stop, the total amount of the flocculant contained in the post-neutralization solution amounts to "the amount of flocculant to be newly added+the amount of flocculant in the post-neutralization solution to be circulated". For example, if the amount of flocculant contained in the post-neutralization solution to be circulated is small, the amount of flocculant to be newly added may be regulated to an amount corresponding to ½ or ⅓ of that of a normal case, taking account of a flow rate of the post-neutralization solution to be circulated. This allows the lowering of an aggregating effect to be suppressed in the separation step S32, and lowering the viscosity of the post-neutralization solution. The amount of addition of the flocculant can easily be regulated by calculating the amount of the flocculant contained in the post-neutralization solution to be circulated.

In this connection, as to whether the addition of the flocculant is stopped or is regulated in the separation step S32, when the post-neutralization solution is circulated by returning back a predetermined rate of the post-neutralization solution to the neutralization reaction tank 11, it should be selected in proportion to the length of a retention time that can gain according to a capacity of the storage tank 13. In other words, in a case where the storage tank 13 has a large capacity enough for gaining a sufficient time, it should select a method for adjusting the amount of addition of the flocculant. Contrarily, in a case where the storage tank 13 has a small capacity, it should determine beforehand a uniform operation rule such that when the viscosity of the post-neutralization solution becomes higher than a predetermined value, the addition of the flocculant is stopped, taking account of convenience of operation (in view of failsafe). Taking such a measure is preferable in that it can save labor to be taken for calculating the amount of adjustment of an additive agent and prevent an operational artificial mistake, such as an error in the addition of the additive agent.

As stated above, when the viscosity of the post-neutralization solution is determined to be higher than a predetermined value, based on the measured results of the viscosity of the post-neutralization solution, a flow rate of the post-neutralization solution transferred to the dezincification reaction tank 31 is controlled in the flow-feeding step S35, and the post-neutralization solution is circulated by returning back a predetermined rate of the post-neutralization solution to the neutralization reaction tank 11. This enables the viscosity of the post-neutralization solution overflowed from the separation tank 12 in the separation step S32 to be gradually lowered.

The viscosity of the post-neutralization solution stored in the storage tank 13 is continuously measured hereafter, in a same manner. When the viscosity of the post-neutralization solution is sufficiently decreased to predetermined viscosity or less, a switching valve 20 provided in the flow-feeding pipe 15 is adjusted in the flow-feeding step S35, and the post-neutralization solution stored in the storage tank 13 is transferred to the dezincification reaction tank 31 used in the dezincification step S4 subsequent to the neutralization step S3. At this moment, the amount of addition of the flocculant in the separation step S32 is restored to that in a normal operation.

Thus, the control of the neutralization in the neutralization step S3 enables the post-neutralization solution having high viscosity to be prevented from being transferred to the dezincification step S4 subsequent to the neutralization step S3, thereby improving the filterability in separating the zinc sulfide produced in the dezincification step S4. This suppresses the occurrence of the clogging in the filter cloth and prolongs a service life of the filter cloth. Further, suppressing the occurrence of the clogging in the filter cloth allows the frequency of cleaning operation of the filter cloth to be effectively lowered, thus making it possible to realize an effective operation including cost. Specifically, the invention allows the frequency of cleaning operation of the filter cloth to be reduced up to about half than before, which prolongs a service life of the filter cloth up to about four times.

When the viscosity of the post-neutralization solution amounts to a predetermined value or more, the neutralized sediment slurry which is taken out and discharged from the bottom of the separation tank 12 may be repeatedly returned back to the solid-liquid separating step S2 preceding the neutralization step S3, in addition to an operation of circulating the post-neutralization solution by returning back a predetermined rate of the post-neutralization solution to the neutralization reaction tank 11, as mentioned above. Particularly, when the viscosity of the measured post-neutralization solution is higher than $0.5 \text{ sec/cm}^2 \cdot \text{mL}$ under the above-mentioned viscosity evaluation criteria, the post-neutralization solution is in the state of excessively high viscosity. In the event that such post-neutralization solution is transferred as it is to the dezincification plant 31 where the dezincification step S4 is performed, it strikingly impairs the filterability in performing the solid-liquid separation. Therefore, in the event that the viscosity of the measured post-neutralization solution is higher than $0.5 \text{ sec/cm}^2 \cdot \text{mL}$ under the above-mentioned viscosity evaluation criteria, the neutralized sediment slurry should be repeatedly returned back to the solid-liquid separating step S2, in addition to circulation control of the post-neutralization solution. This more effectively lowers the viscosity of the post-neutralization solution.

In some cases, there can be a case, in a real operation, where a large quantity of flocculant is injected to the extent where the viscosity does not greatly lower caused by a human error (artificial operation error) or the like, even if the post-neutralization solution is remained for a predetermined time in the storing step S34. For example, there can be a case, according to circumstances, where a lot of post-neutralization solution is too stored, in comparison to a capacity of the storage tank 13, to expect further lowering of the viscosity before the post-neutralization solution is stored for sufficiently lowering its viscosity.

In such a situation, it had better to increase the amount of the neutralized sediment separated in the separation step S32 of the neutralization step S3, and repeatedly charge in a multistage cleaning step of the solid-liquid separating step S2. Then, a liquid-phase component whose viscosity becomes too much higher is repeatedly charged in the multistage cleaning step of the solid-liquid separating step S2 with the neutralized sediment thereof. The liquid-phase component charged with the neutralized sediment in the solid-liquid separating step S2 is diluted by the multistage cleaning, which enables the viscosity of the liquid-phase component to be lowered.

<<3-4. Dezincification Step>>

In the dezincification step S4, the post-neutralization solution produced from the neutralization step S3 is sulfidized by adding a sulfurization gas thereto to produce a zinc sulfide, and the zinc sulfide is separated to produce a mother liquid for nickel recovery (post-dezincification solution) containing nickel and cobalt.

Specifically, for example, the post-neutralization solution containing zinc together with nickel and cobalt is introduced into a pressurized vessel where zinc is selectively sulfurized with respect to nickel and cobalt, and the zinc sulfide and the mother liquid for nickel recovery are produced.

<<3-4-1. Dezincification Plant>>

Figure 4:
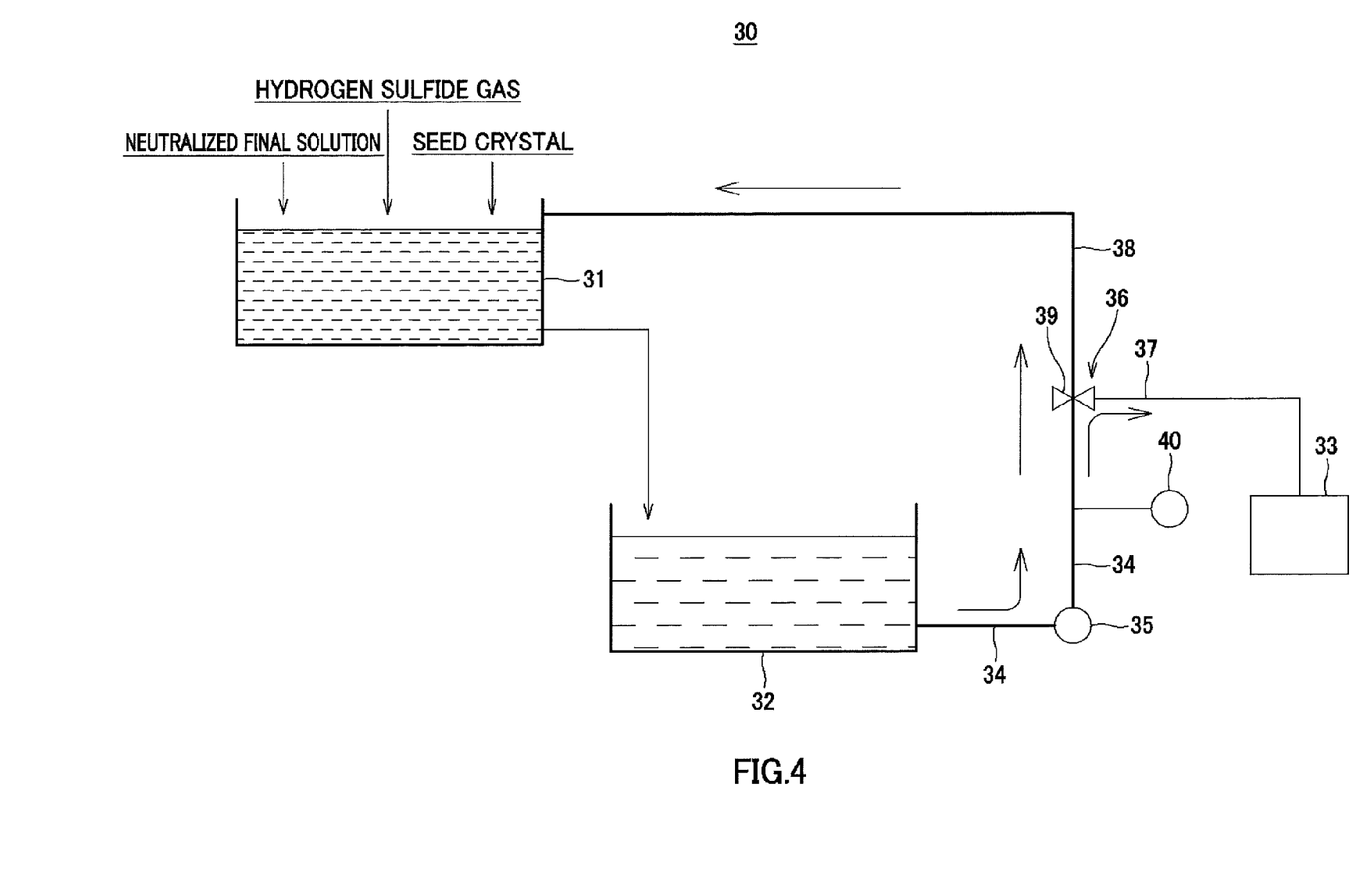
FIG. 4 is a schematic block diagram of a dezincification plant.

Herein, a description will be made to the dezincification plant used in the dezincification step S4. FIG. 4 is a schematic block diagram showing an arrangement of the dezincification plant used in the dezincification step S4. As shown in FIG. 4, a dezincification plant 30 comprises a dezincification reaction tank 31 where the post-neutralization solution is performed sulfurization reaction by blowing a hydrogen sulfide gas in the post-neutralization solution; a storage tank 32 where the produced zinc sulfide and the mother liquid for nickel recovery that is a post-sulfurization reaction solution are temporarily stored; and a filter device 33 separating and removing the zinc sulfide.

Within the dezincification reaction tank 31, the post-neutralization solution produced in the above-mentioned neutralization step S3 and transferred is charged, where the post-neutralization solution is performed sulfurization reaction by adding the hydrogen sulfide gas to the post-neutralization solution. Within the dezincification reaction tank 31, a zinc sulfide based on the zinc contained in the post-neutralization solution is produced by adding the hydrogen sulfide gas to the post-neutralization solution. The post-sulfurization solution in the dezincification reaction tank 31 is a solution free from zinc and serves as a mother liquid for nickel recovery.

The zinc sulfide and the mother liquid for nickel recovery produced in the dezincification reaction tank 31 are transferred as they are to the next storage tank 32.

The storage tank 32 is configured to charge the zinc sulfide produced in the dezincification reaction tank 31 and the mother liquid for nickel that is a post-sulfurization solution. The storage tank 32 temporarily stores the zinc sulfide and the mother liquid for nickel recovery before they are separated and transferred to a nickel recovery step S5 subsequent to the dezincification step S4. At the time of startup of the dezincification plant 30, a post-neutralization solution, which is flow-fed without being sulfurized in the dezincification reaction tank 31, is stored in the storage tank 32, the details of which will be described later.

The storage tank 32 is provided with a flow-feeding pipe 34 flow-feeding the stored zinc sulfide and mother liquid for nickel recovery. The flow-feeding pipe 34 flow-feeds the stored zinc sulfide and the mother liquid for nickel recovery in the storage tank 32 to a filter device 33 with the aid of a flow-feeding pump 35. Further, the flow-feeding pipe 34 is branched off at a predetermined position 36, and to which a transfer pipe 37 for transferring the mother liquid for nickel recovery containing the zinc sulfide stored in the storage tank 32 to the filter device 33, and a circulation pipe 38 for circulating, at the time of startup of the dezincification plant 30, the post-neutralization solution stored in the storage tank 32 is circulated by repeatedly returning back the post-neutralization solution to the dezincification reaction tank 31 are respectively coupled. Furthermore, in the branched position 36 (junction) to which the transfer pipe 37 and the circulation pipe 38 are coupled, a switching valve 39 is provided. The switching valve 39 is capable of switching and adjusting of a transfer rate and transfer timing to the filter device 33 or to the dezincification reaction tank 31 via the flow-feeding pipe 34. Moreover, the flow-feeding pipe 34 is provided with a measuring portion 40 able to measure a flow rate and/or temperature of the mother liquid for nickel recovery containing the flow-fed zinc sulfide and the circulated post-neutralization solution.

The filter device 33 is composed of a predetermined filter cloth having a mesh opening size or the like, and separates the zinc sulfide and the mother liquid for nickel recovery from the mother liquid for nickel recovery containing zinc sulfide flow-fed through the transfer pipe 37 via the flow-feeding pipe 34.

As mentioned above, since the neutralization plant 10 used in the neutralized step S3 controls a flow rate of the post-neutralization solution transferred to the dezincification reaction tank 31 of the dezincification plant 30, depending on the viscosity of the produced post-neutralization solution, the dezincification plant 30 effectively prevents the post-neutralization solution having high viscosity from being transferred thereto. For that reason, the filter device 33 of the dezincification plant 30 reduces clogging in the filter cloth, and separates and removes the zinc sulfide with high filterability. Further, the filter device 33 can reduce the clogging in the filter cloth, which prolongs a service life of the filter cloth, thereby improving the efficiency of an operation of the hydrometallurgy.

<3-4-2. Operation Method for Dezincification Plant>

In the plant used for an operation of the hydrometallurgy including the above-mentioned dezincification plant 30, a periodic equipment inspection is performed. In the periodic inspection, the whole tank, such as a reaction tank and a storage tank storing process water is cleaned and the sludge adhered to the bottom of the tank and a filter is removed, and damaged parts are replaced with new ones. Therefore, at the time of periodic inspection, the process water, such as the post-neutralization solution and the post-dezincification solution, are drained out from at least equipments under periodic inspection to completely empty the equipments. Accordingly, at the time of startup of the plant after periodic inspection, temperature of the equipments and the process water are being lowered to approximately air temperature (for example, 30 degrees C. or so). Additionally, a flow rate of the process water is very little.

Conventionally, when the plant is started up, after periodic inspection, about one day (24 hours or so) is taken, for the leaching step S1 in which slurry of nickel oxide ore are leached, under high temperature and high pressure, by adding sulfuric acid thereto, to reach its an operating state of 100%. Therefore, the plant falls into a condition where the flow rate and temperature are extremely unstable until the plant reaches its full operating state (normal operation level). Where a great impact is had is the dezincification step S4 when they are in such an unstable state. In which case, it will become very difficult to blow a hydrogen sulfide gas in the process water whose flow rate and the temperature are unstable, that is, in the post-neutralization solution to be sulfurized, and to simultaneously add suspended solids as a seed crystal. This means that zinc that is impurities is got mixed, in high density, into the post-solution (mother liquid for nickel recovery) produced after dezincification reaction by sulfurization treatment.

Accordingly, it has been taken thus far measures to add excess hydrogen sulfide gas, in order not to remain the zinc in the mother liquid for nickel recovery produced in the dezincification step S4, for about one day, when startup of the plant after periodic inspection. However, there have been shortcomings, in this case, that a grain size of the produced zinc sulfide exceedingly is fined down and a heavy load is placed on the above-mentioned filter device 33, eventuating in that a service life of the filter cloth consisting the filter device 33 becomes shorter. Moreover, the fine zinc sulfide invites waste of time required for replacement of the filter cloth, and a recovery loss of valuable metals in the mother liquid for nickel recovery to be disposed incident to the replacement thereof.

Upon this, in the dezincification plant 30 used in the dezincification step S4, the plant is designed to operate as follows. When the dezincification plant is started up after periodic inspection thereinto, the switching valve 39 in the flow-feeding pipe 34 provided in the storage tank 32 is adjusted without applying sulfurization treatment to the post-neutralization solution in the dezincification reaction tank 31, at the time of startup of the dezincification plant, and the transferred post-neutralization solution is circulated by returning back the post-neutralization solution to the dezincification reaction tank 31 via the circulation pipe 38.

In the dezincification plant 30, a flow rate and/or temperature of the post-neutralization solution to be circulated is measured by a measuring portion 40 provided in the flow-feeding pipe 34. When the flow rate and/or temperature of the post-neutralization solution exceed a predetermined value, the post-neutralization solution is sulfurized in the dezincification reaction tank 31 to produce a zinc sulfide, and a mother liquid for nickel recovery (post-dezincification solution) containing the zinc sulfide is transferred to the filter device 33 via the transfer pipe 37 by adjusting the switching valve 39.

Herein, no special limitation is imposed on a predetermined reference value of flow rate of the circulated post-neutralization solution to be measured by the measuring portion 40 but it should take a flow rate as a reference value to determine whether the flow rate can make the sulfurization reaction in the dezincification reaction tank 31 progress effectively. For example, a flow rate during a normal operation may be taken as a reference value. Further, no special limitation is imposed on a predetermined reference value of temperature of the circulated post-neutralization solution to be measured by the measuring portion 40 but it should take any temperature as a reference value to determine whether it is temperature which can make the sulfurization reaction in the dezincification reaction tank 31 effectively progress. For example, temperature of 50 degrees C. or so may be taken as a reference value.

Thus, in the dezincification plant 30, it is controlled so as to circulate the post-neutralization solution at the time of startup of the dezincification plant, and it is determined whether a flow rate and temperature of the post-neutralization solution exceed, for example, a flow rate during a normal operation and temperature of 50 degrees C. or so. After having verified that the flow rate and the temperature exceed a predetermined value, the post-neutralization solution is sulfurized, and the mother liquid for nickel recovery containing zinc sulfide is transferred to the filter device 33.

In the dezincification plant 30 used in the dezincification step S4, the flow rate and the temperature of the post-neutralization solution that is process water can be stabilized by performing a startup operation of the dezincification plant after periodic inspection, as mentioned above. This allows the stabilized post-neutralization solution to be sulfurized in the dezincification reaction tank 31 and transferred to the filter device 33.

This effectively changes the zinc into the zinc sulfide without addition of an excess hydrogen sulfide gas, which effectively reduces zinc concentration in the mother liquid for nickel recover (post-dezincification solution) to 1 mg/L or less. Further, this prolongs a service life of the filter cloth without placing a heavy load to the filter cloth of the filter device 33. Moreover, this makes it possible to more effectively and more quickly perform a startup operation of the dezincification plant, which has been conventionally taken about one day to restore to a normal operation. This stabilizes the startup operation of the dezincification plant to a normal operation level in a short time, thereby enhancing efficiency of operation.

At the startup of the dezincification plant after periodic inspection, it is more preferable to carry out flow control of the post-neutralization solution in the neutralization plant 10 used in the neutralization step S3, in addition to the above-mentioned control by circulation of the post-neutralization solution in the dezincification plant 30.

Specifically, in the neutralization step S3, at the time of startup of the dezincification plant 30 after periodic inspection thereof, the switching valve 20 provided in the flow-feeding pipe 15 of the neutralization plant 10 is controlled to circulate the post-neutralization solution by returning back the post-neutralization solution to the neutralization reaction tank 11. That is, the post-neutralization solution is circulated within the dezincification plant 10 without transferring the post-neutralization solution to the dezincification plant 30. When the flow rate and/or the temperature of the post-neutralization solution measured by the above-mentioned measuring portion 40 provided in the flow-feeding pipe 34 of the dezincification plant 30 exceed a predetermined value, the post-neutralization solution is transferred to the dezincification tank 31 via the transfer pipe 18 by adjusting the switching valve 20.

At this moment, it is preferable to circulate, in the neutralization plant 10, the post-neutralization solution to be circulated, while heating, by returning back the post-neutralization solution to the neutralization reaction tank 11. As a heating method, a heat exchanger provided in the circulation pipe 19 of the neutralization plant 10 may be used to this end.

Thus, the flow control of the post-neutralization solution in the neutralization plant 10, in addition to the above-mentioned control in the dezincification plant 30, enables an operation of the neutralization plant to be stabilized, in a shorter time, after startup of the dezincification plant. This makes the sulfurization treatment progress effectively in the dezincification plant 30, which more effectively reduces zinc concentration in the mother liquid for nickel recovery. Further, as mentioned above, circulating the post-neutralization solution, while heating, in the neutralization plant 10 elevates temperature of the post-neutralization solution within the dezincification plant 10, thereby more effectively elevating temperature of the post-neutralization solution transferred to the dezincification reaction tank 31. This strives for stabilization of an operation in a shorter time, which effectively reduces the zinc concentration in the mother liquid for nickel recovery.

<<3-5. Nickel Recover Step>>

In the nickel recovery step S5, sulfurization reaction occurs by blowing a hydrogen sulfide gas in the mother liquid for nickel recovery produced, as a zinc sulfide, in the dezincification step S4, by separating and removing the zinc that is impurity elements, thereby producing a sulfide (nickel mixed-cobalt sulfide) containing nickel and cobalt and a barren solution.

The mother liquid for nickel recovery is a sulphuric acid solution whose impurity ingredients are reduced from the leachate of the nickel oxide ore through the neutralization step S3 and the dezincification step S4. For example, pH is 3.2 to 4.0, nickel concentration is 2 to 5 g/L, and cobalt concentration is 0.1 to 1.0 g/L. Note that there is a possibility that the mother liquid for nickel recover may contain iron, magnesium, manganese or the like, as impurity ingredients as much as few g/L or so. However, these impurity ingredients have low stability as a sulfide in comparison with nickel and cobalt to be recovered and thus inclusion of the impurity ingredients in the sulfide to be produced never happens.

In the nickel recovery step S5, the mixed nickel-cobalt sulfide containing less impurity ingredients and the barren solution where nickel concentration is stabilized at a low level are produced and recovered. Specifically, the mixed nickel-cobalt sulfide that is a sediment is separated and recovered from the bottom of the thickener by sedimenting and separating slurry of the mixed nickel-cobalt sulfide by using a precipitator, such as a thickener. Meanwhile, aqueous solution ingredients are overflowed and recovered as barren solution. As mentioned above, the barren solution contains impurity elements, such as iron, magnesium, and manganese, which are contained therein without being sulfurized.

4. EXAMPLES

While examples of the present invention will be described, the present invention is not necessarily limited thereto.

Examples

Example 1

Neutralization was applied, in the neutralization step, to the leachate produced by leaching the ore slurry of the nickel oxide ore by using the HPAL process. In the neutralization step, the leachate was controlled to pH 3.3 by adding calcium carbonate that is neutralizer to the leachate to generate neutralization, and the produced neutralized sediment and the post-neutralization solution were separated by using the thickener by adding flocculant to the neutralized slurry.

In the neutralization of the neutralization step, the amount of the neutralized sediment in filtrate and the amount of suspended solids composed of the leached residue produced from the leaching step were adjusted to produce the post-neutralization solution (sulfurized initial solution) whose turbidity was adjusted to 112 NTU by regulating the amount of addition of the flocculant, following the method disclosed in Patent Document 3.

The viscosity of the produced post-neutralization solution was measured by measuring the viscosity of a supernatant liquid on the thickener, every 60 minute. The viscosity was measured based on the time required for the supernatant liquid of 50 cc to pass through the membrane filer having a mesh opening size of 0.45 μm (17 cm$^2$). An operation was performed to transfer the post-neutralization solution to the dezincification tank (sulfurization reaction tank) used in the dezincification step subsequent to the neutralization step, with a flow rate of the produced post-neutralization solution set to 360 to 450 m$^3$/hr.

In the viscosity measurement of the post-neutralization solution, when the viscosity of the neutralized solution was higher than 0.10 sec/cm$^2$·mL, it was determined to be viscosity anomaly (over) of the post-neutralization solution, and the switching valve in the flow-feeding pipe provided in the storage tank of the neutralization plant was adjusted. Then, one year operation was performed with a flow rate of the post-neutralization solution transferred to the dezincification reaction tank used in the dezincification reaction step subsequent to the neutralization step set to 70%, and a flow rate of the post-neutralization solution produced by returning back the post-neutralization solution returned back to the neutralization reaction tank set to 30%.

Subsequently, in the dezincification step, a gas for sulfurization was inserted into a gas phase in the dezincification tank so that vessel pressure was maintained at 0.02 MPa by using the post-neutralization solution produced in the neutralization step to produce a zinc sulfide. Then, the zinc sulfide was separated with a filter press. Herein, the post-neutralization solution was continuously inserted into the dezincification tank to generate a reaction while stirring the post-neutralization solution with temperature thereof maintained at 55 degrees C. After that, the filterability of the zinc sulfide produced in the dezincification step was evaluated.

Consequently, a filtration rate of the zinc sulfide exceeded 23 $m^3/m^2 \cdot h$, exhibiting very sufficient filterability, as filterability of the zinc sulfide. In the operation of Example 1, when the frequency of cleaning operation of the filter cloth consisting the filter press used for solid-liquid separation in the dezincification step and a service life of the filter cloth were investigated, the investigation showed that the frequency of cleaning operation was once/two weeks or so and a service life of the filter cloth was four months on average.

When the above-mentioned operation of Example 1 was performed and the viscosity of the post-neutralization solution transferred to the dezincification reaction tank used in the dezincification step was measured based on the time required for the post-neutralization solution of 50 cc to pass through the membrane filter having a mesh opening size of 0.45 μm (17 $cm^2$), the measurement showed that the viscosity was 0.008 $sec/cm^2 \cdot mL$, exhibiting effectively lowered viscosity.

Example 2

In Example 2, one year operation was performed, as with Example 1, excepting that neutralization reaction was generated by adding calcium carbonate to the leachate in the neutralization step to control the post-neutralization solution to pH 3.2, and the turbidity of the post-neutralization solution (sulfidized initial solution) was adjusted to 232 NTU by regulating the amount of addition of the flocculant.

Consequently, a filtration rate exceeded 18 to 23 $m^3/m^2 \cdot h$, exhibiting sufficient filterability, as filterability of the zinc sulfide.

Example 3

In Example 2, one year operation was performed, as with Example 1, excepting that the turbidity of the post-neutralization solution (sulfidized initial solution) was adjusted to 354 NTU by regulating the amount of addition of the flocculant.

Consequently, a filtration rate amounted to 18 to 23 $m^3/m^2 \cdot h$, exhibiting sufficient filterability, as filterability of the zinc sulfide.

Comparative Example 1

In Comparative Example 1, one year operation was performed, as with Example 1, excepting that the total amount of the produced post-neutralization solution was directly transferred to the dezincification reaction tank used in the dezincification step without measuring the viscosity of the post-neutralization solution.

Consequently, whereas a filtration rate amounted to 10 to 18 $m^3/m^2 \cdot h$, exhibiting effectively improved filterability, as filterability of the zinc sulfide, the filterability was lowered, as compared with those achieved in the foregoing Examples 1 to 3. Further, in the operation of Comparative Example 1, when the frequency of cleaning operation of the filter cloth consisting the filter press used for solid-liquid separation in the dezincification step and a service life of the filter cloth were investigated, the investigation showed that the frequency of cleaning operation was once/three days on average. Therefore, one was forced to perform a frequent cleaning operation, and further to replace the filter cloth with new one, per one month on average.

When the operation of the above-mentioned Comparative Example 1 was performed, and the viscosity of the post-neutralization solution transferred to the dezincification reaction tank used in the dezincification step was measured based on the time required for the post-neutralization solution of 50 cc to pass through the membrane filter having a mesh opening size of 0.45 μm (17 $cm^2$), the measurement showed that the viscosity was 0.163 $sec/cm^2 \cdot mL$, and the post-neutralization solution having high viscosity was transferred.

Comparative Example 2

In Comparative Example 2, the total amount of the produced post-neutralization solution was directly transferred to the dezincification reaction tank used in the dezincification step without measuring the viscosity of the post-neutralization solution. Further, neutralization was carried out by adjusting the post-neutralization solution to pH 2.9 in the neutralization step without following the method disclosed in Patent Document 3. Other than the above, one year operation was performed, as with Example 1.

Consequently, a filtration rate decreased to below 10 $m^3/m^2 \cdot h$, exhibiting considerably bad filterability, as filterability of the zinc sulfide. In addition, stubborn clogging occurred in only a day from the startup of the plant after replacement of the filter cloth consisting the filter press. As a result, the effect achieved by cleaning operation of the filter cloth was hardly lost, and the filter cloth reached its service life in only a day, resulting in the filter cloth being forced to replace with new one.

Comparative Example 3

In Comparative Example 3, the total amount of the produced post-neutralization solution was directly transferred to the dezincification reaction tank used in the dezincification step without measuring the viscosity of the post-neutralization solution. The nickel leached residue was not added without following the method disclosed in Patent Document 3. Other than the above, one year operation was performed, as with Example 1.

Consequently, a filtration rate decreased to below 10 $m^3/m^2 \cdot h$, exhibiting considerably bad filterability, as filterability of the zinc sulfide. Stubborn clogging occurred in only a day from the startup of the plant after replacement of the filter cloth consisting the filter press. As a result, the effect achieved by cleaning operation of the filter cloth was hardly lost, and the filter cloth reached its service life in only a day, resulting in the filter cloth being forced to replace with new one.

Comparative Example 4

In Comparative Example 4, the total amount of the produced post-neutralization solution was directly transferred to the dezincification reaction tank used in the dezincification step. Further, the turbidity of the produced post-neutralization solution was adjusted to 521 NTU without following the method disclosed in Patent Document 3. Other than above, one year operation was performed, as with Example 1.

Consequently, a filtration rate decreased to below 10 m³/m²·h, exhibiting considerably bad filterability, as filterability of the zinc sulfide. In addition, stubborn clogging occurred in only a day from the startup of the neutralization plant after replacement of the filter cloth consisting the filter press. As a result, the effect achieved by cleaning operation of cleaning of the filter cloth was hardly lost, and the filter cloth reached its service life in only a day, resulting in the filter cloth being forced to replace with new one.

The results of each Example and Comparative Example were collectively tabulated in Table 1 below. When evaluating the filterability of the zinc sulfide shown in Table 1, in a case where a filtration rate exceeded 23 m³/m²·h, it was denoted by "⊚", in a case a filtration rate was more than 18 to 23 m³/m²·h, it was denoted by "○", in a case where a filtration rate was less than 10 to 18 m³/m²·h, it was denoted by "Δ", and in a case where a filtration rate was less than 10 m³/m²·h, it was denoted by "X", respectively.

TABLE 1

| | pH of post-neutralization solution | Additive rate of nickel leached residue (flow rate %) | Turbidity of sulfurization reaction initial solution (NTU) | Filterability of zinc sulfide |
|---|---|---|---|---|
| Example 1 | 3.3 | 1.5 | 112 | ⊚ |
| Example 2 | 3.2 | 1.0 | 232 | ○ |
| Example 3 | 3.3 | 1.5 | 354 | ○ |
| Comparative Example 1 | 3.4 | 0.5 | 385 | Δ |
| Comparative Example 2 | 2.9 | 1.5 | 220 | X |
| Comparative Example 3 | 3.2 | 0 | 325 | X |
| Comparative Example 4 | 3.2 | 2.0 | 521 | X |

The results of the investigation into the frequency of cleaning operation of the filter cloth as well as a service life of the filter cloth obtained in the example 1 and the comparative example 1 were collectively tabulated in Table 2 below.

TABLE 2

| | Filtration rate of post-neutralization solution (sec/cm² · mL) | Frequency of cleaning operation of filter cloth | Average service life of filter cloth |
|---|---|---|---|
| Example 1 | 0.008 | once/two weeks | four months |
| Comparative Example 1 | 0.163 | once/three days | one month |

Tables 1, 2 showed the following results. The viscosity of the post-neutralization solution produced in the neutralization step was measured. If the viscosity of the post-neutralization solution was higher than 0.10 sec/cm²·mL, it was determined to be viscosity anomaly of the post-neutralization solution. Then, controlling a flow rate of the post-neutralization solution transferred to the dezincification reaction tank used in the dezincification step subsequent to the neutralization step improved the filterability of the dezincification sulfide produced in the dezincification step by returning back a predetermined rate of the post-neutralization solution to the neutralization reaction tank. This suppressed the occurrence of the clogging in the filter cloth to reduce the frequency of cleaning operation of the filter cloth, and effectively prolonging a service life of the filter cloth.

REFERENCE SIGN LIST

10 . . . neutralization plant
11 . . . neutralization reaction tank
12 . . . separation tank
13, 32 . . . storage tank
14 . . . viscosity measuring portion
15, 34 . . . flow-feeding pipe
16, 35 . . . flow-feeding pump
17, 36 . . . branched position
18, 37 . . . transfer pipe
19, 38 . . . circulation pipe
20, 39 . . . switching valve
30 . . . dezincification plant
31 . . . dezincification reaction tank
33 . . . filter device
40 . . . measuring portion

The invention claimed is:

1. A neutralization method used in a neutralization step of neutralizing leachate produced by leaching nickel oxide ore, and producing neutralized sediment containing impurities and a post-neutralization solution containing zinc together with nickel and cobalt, in a hydrometallurgy process for nickel oxide ore, the method comprising:

a neutralization reaction step of neutralizing the leachate in a neutralization reaction tank;

a separation step of separating neutralized slurry into neutralized sediment and the post-neutralization solution by adding flocculant to the slurry;

a viscosity measuring step of measuring the viscosity of the post-neutralization solution produced through the separation step;

a storing step of temporarily storing the post-neutralization solution in a storage tank; and a flow-feeding step of transferring the stored post-neutralization solution to a dezincification reaction tank used in a dezincification step subsequent to the neutralization step, wherein in the flow-feeding step, when the post-neutralization solution has a viscosity, as measured in the viscosity measuring step such that the rate for passing 50 mL of the post-neutralization solution through a membrane filter having a mesh opening size of 0.45 μm, that is higher than 0.10 sec/cm²·mL, a flow rate of the post-neutralization solution to be transferred to the dezincification reaction tank is controlled, and the post-neutralization solution is circulated by returning back a predetermined rate of the post-neutralization solution to the neutralization reaction tank, and when the viscosity of the post-neutralization solution measured in the viscosity measuring step is higher than 0.10 sec/cm²·mL, a flow rate of the post-neutralization solution to be transferred to the dezincification reaction tank used in the dezincification step is set to 60 to 80% for the total flow rate, and a flow rate of the post-neutralization solution to be circulated by returning back the post-neutralization solution to the neutralization reaction tank is set to 20 to 40% for the total flow rate.

2. The neutralization method according to claim 1, wherein in the flow-feeding step, when the post-neutralization solution is circulated by returning back the predetermined rate of the post-neutralization solution to the neutralization reaction tank, the flocculant is not added in the separation step.

3. The neutralization method according to claim 1, wherein the storage tank has a capacity corresponding to an amount of storage of more than 3 hours with respect to the flow rate of the post-neutralization solution.

4. The neutralization method according to claim 1, wherein the hydrometallurgy process for nickel oxide ore further comprises:
  a leaching step of leaching slurry of the nickel oxide ore, under high temperature and high pressure, by adding sulfuric acid to the slurry of the nickel oxide ore;
  a solid-liquid separating step of separating residue while multistage cleaning the leached slurry to produce leachate containing impurity elements together with nickel and cobalt;
  a neutralization step of separating the neutralized sediment containing the impurity elements by controlling pH of the leachate to produce the post-neutralization solution containing zinc together with nickel and cobalt;
  a dezincification step of producing a zinc sulfide by applying sulfurization treatment to the post-neutralization solution and separating the zinc sulfide to produce a mother liquid for nickel recovery containing nickel and cobalt; and
  a nickel recovery step of producing a mixed sulfide containing nickel and cobalt by applying sulfurization treatment to the mother liquid for nickel recovery.

5. The neutralization method according to claim 4, wherein the neutralized sediment separated in the neutralization step is repeatedly added in multistage cleaning in the solid-liquid separating step.

* * * * *